United States Patent [19]

Morris et al.

[11] E Re. 28,996

[45] Reissued Oct. 5, 1976

[54] GROUND LEAKAGE DIFFERENTIAL PROTECTIVE APPARATUS

[75] Inventors: Alton R. Morris; Thomas M. McDonald, both of Monroe, Conn.

[73] Assignee: Harvey Hubbell Incorporated, Bridgeport, Conn.

[22] Filed: Feb. 19, 1975

[21] Appl. No.: 551,002

Related U.S. Patent Documents

Reissue of:

[64] Patent No.: 3,473,091
Issued: Oct. 14, 1969
Appl. No.: 630,932
Filed: Apr. 14, 1967

[52] U.S. Cl. ..... 317/18 D; 317/27 R
[51] Int. Cl.[2] ..... H02H 1/02
[58] Field of Search ..... 317/18 D, 27 R

[56] References Cited

UNITED STATES PATENTS

| | | | |
|---|---|---|---|
| 3,187,225 | 6/1965 | Mayer | 317/18 D |
| 3,214,638 | 10/1965 | Moser et al. | 317/18 D |
| 3,296,493 | 1/1967 | Whittaker et al. | 317/18 D |

FOREIGN PATENTS OR APPLICATIONS

| | | | |
|---|---|---|---|
| 677,850 | 1/1964 | Canada | 317/27 R |
| 1,141,367 | 12/1962 | Germany | 317/18 D |
| 1,175,349 | 8/1964 | Germany | 317/18 D |
| 376,250 | 6/1932 | United Kingdom | 317/18 D |

*Primary Examiner*—Harry Moose
*Attorney, Agent, or Firm*—Wooster, Davis & Cifelli

[57] ABSTRACT

A ground leakage differential current protective apparatus of the differential transformer type. An impedance is inserted in the grounded neutral line in series with the transformer and the load. A low impedance ground in the grounded neutral conductor still permits a potential to be developed across the grounded neutral winding so that the differential current required to initiate the tripping action is not substantially increased.

1 Claim, 3 Drawing Figures

INVENTORS
Alton R. Morris
BY Thomas M. McDonald
Wooster, Davis & Cipolli
ATTORNEYS.

GROUND LEAKAGE DIFFERENTIAL PROTECTIVE APPARATUS

Matter enclosed in heavy brackets [ ] appears in the original patent but forms no part of this reissue specification; matter printed in italics indicates the additions made by reissue.

BACKGROUND OF THE INVENTION

This invention relates to ground leakage differential protective apparatus and, more particularly, to such apparatus which is substantially insensitive to the presence of accidental grounds in the neutral conductor between the apparatus and the load to be protected.

Currently, one of the most active areas in the field of electrical protection lies in differential ground leakage protection devices. The function of these devices, which are currently under development, is to disconnect the power supply very rapidly whenever a stray path to ground occurs. For example, if any animal or person should touch the energized, or hot, line leading to an electrical load, the presence of the extraneous circuit to ground will immediately trip a circuit breaker, deenergizing the load and thus saving the object of the ground from possible serious injury or death. Most of these devices operate on the differential transformer principle. A differential transformer customarily comprises an integral magnetic core in the form of a closed loop such as a toroid. Upon this core are positioned two primary windings of one or more turns which are connected in series with the respective line or neutral conductors feeding the load. These windings are so arranged that, when equal currents are passing through them, they produce opposing magnetic fluxes. A secondary winding is also mounted upon the core and is arranged to trip a circuit breaker in the line conductor. Under normal operation, all the current passing to the load through the line conductor returns to the supply through the neutral conductor. Thus, the respective magnetic fluxes cancel each other and no voltage is induced in the secondary winding. In the event of an accidental grounding of the line conductor, however, a portion of the line current will return to the power supply through the external ground. The resultant imbalance in the currents of the two primary windings creates a resultant flux which induces a voltage in the secondary winding and trips the circuit breaker.

Apparatus of the above type have proved to be very satisfactory under most circumstances. However, there is one disadvantage in apparatus of this type which could create serious safety problems. The problems with the prior apparatus arise if a low impedance ground occurs on the neutral conductor between the differential transformer and the load. If, concurrently with this condition, the line conductor were to become grounded, as through a person, the breaker would not operate at the same value of differential current. As one end of the primary winding in the neutral conductor is grounded at the power supply, a low impedance ground at its other end would, effectively, cause it to be short-circuited. Thus, there would be no potential difference existing across this particular winding. Electrically, the differential transformer would now resemble a current transformer wherein the winding in the line conductor would be the "primary" and the winding in the neutral conductor would be the shorted "secondary." The low impedance existing across this "secondary" winding would be reflected, in accordance with the turns ratio (normally 1:1), to the primary. Consequently, there would be no potential difference across the primary winding and it would be incapable of generating sufficient power in the transformer core to actuate the relay. Therefore, a greater amount of differential current would be required to achieve tripping. The lower the impedance to ground from the neutral conductor, the greater would be the differential current required to effect tripping. It will be immediately apparent to those skilled in the art that, under the proper conditions, this could create a serious safety hazard.

SUMMARY OF THE INVENTION

It is a primary object of this invention to provide an improved ground leakage differential protective apparatus which is substantially insensitive to grounds on the neutral side of the load.

The object of this invention is achieved by means of a ground leakage differential protective circuit having an impedance connected in the neutral conductor between one of the primary windings and the load.

DESCRIPTION OF THE PREFERRED EMBODIMENTS

Figure 1:
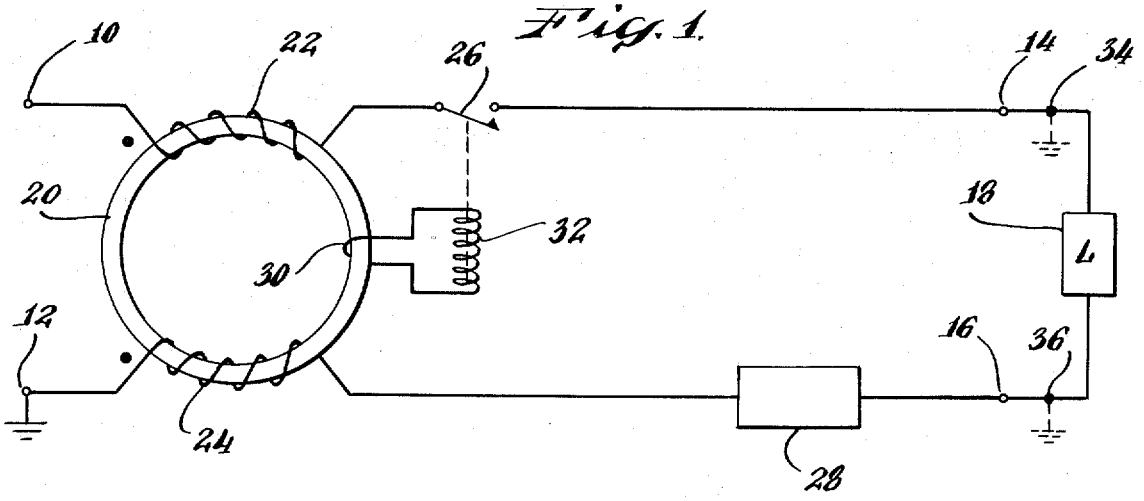
FIG. 1 is a schematic diagram of one form of differential ground leakage protective apparatus in accordance with this invention.

Referring now to FIG. 1 of the drawing, there is illustrated an apparatus in accordance with the invention including input terminals 10, 12 and output terminals 14, 16. Input terminal 10 is designed for connection to the line side of an A.C. power supply and input terminal 12 is designed for connection to the neutral grounded side of an A.C. power supply. The output terminals 14, 16 are designed for connection to an external load 18 to be protected. The apparatus includes a differential transformer comprising a toroidal core 20 having a first primary winding 22 connected to the input terminal 10 and a second primary winding 24 connected to input terminal 12. The other end of primary winding 22 is connected through a circuit breaker 26 to output terminal 14 and the other end of second primary winding 24 is connected through an impedance 28 to output terminal 16. A secondary winding 30 is also associated with core 20 and actuates a tripping circuit which may be, for example, a solenoid 32 arranged to actuate the circuit breaker 26.

In order to understand the operation of this invention, assume now the existence of simultaneous grounds, one at 34 on the line side of load 18 and the other at 36 on the neutral side of load 18. Assume further that ground 36 has a relatively low impedance. In the absence of impedance 28, the second primary winding 24 would be effectively shorted, resulting in a very low potential across winding 22 and very low power transference from primary winding 22 to secondary 30. Thus, a considerable, and possibly dangerous, value of current would be required to flow from ground 34 before the device would trip the circuit breaker 26. However, with impedance 28 in series with primary winding 24, a considerable potential will develop across winding 24 which will permit the operation of the circuit breaker 26 at a substantially unchanged level of differential current. It will be understood that the impedance 28 may be resistive, capacitive, or inductive or any combination of these.

Figure 2:
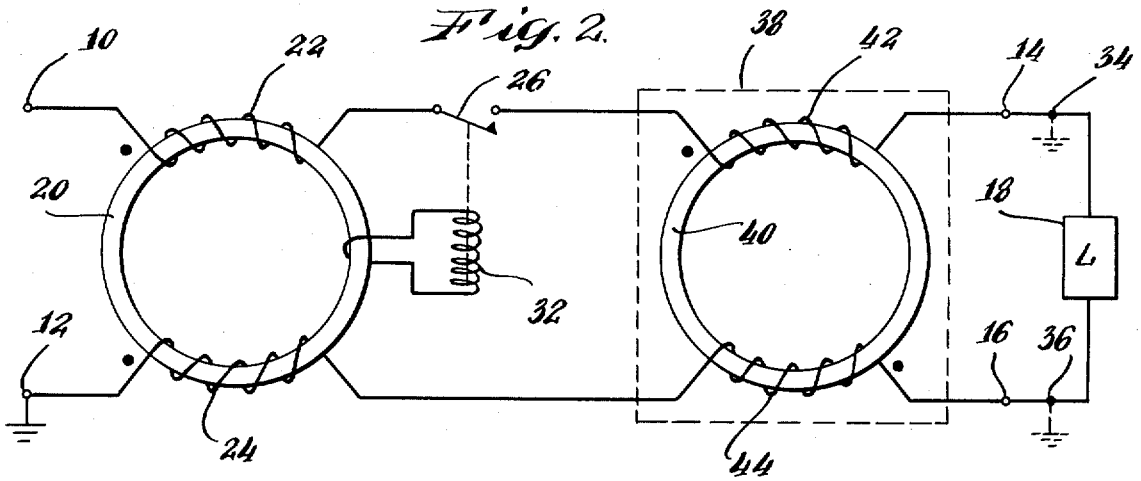
FIG. 2 is a modification of the circuit of FIG. 1.
Figure 3:
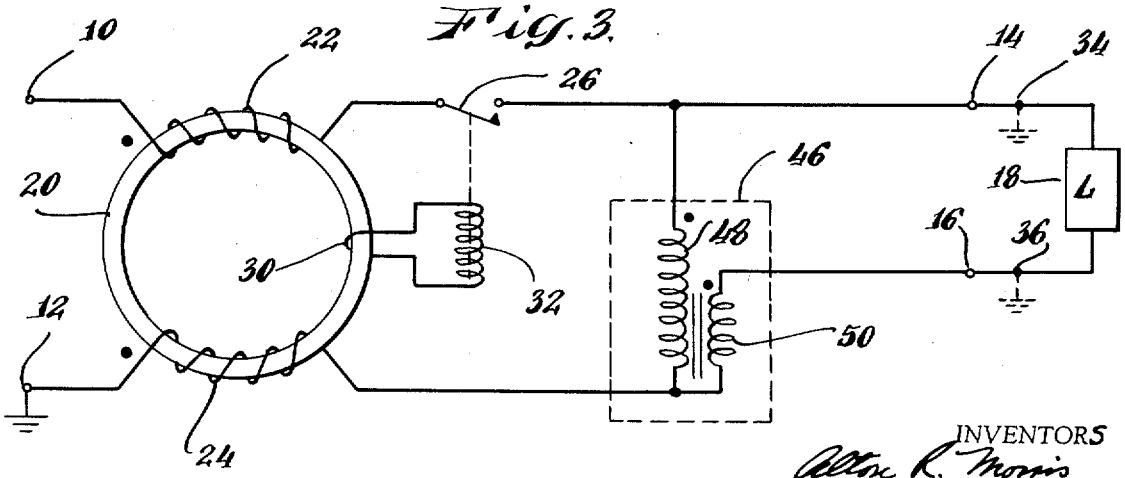
FIG. 3 is a still further modification of the circuit of FIG. 1.

The applications of a circuit as shown in FIG. 1 are limited and it will also be noted that, during normal operation, impedance 28 will add to the impedance of the load. Accordingly, there are illustrated in FIGS. 2 and 3 two modifications which yield the highest impedance in the presence of ground 36 and yet have no appreciable effect on the flow of load current. In each of these modifications, similar elements to those shown in FIG. 1 are given similar reference numerals. In FIG. 2 there is added an auxiliary transformer 38 which comprises a toroidal magnetic core 40 having a *first* winding 42 connected in series with output terminal 14 and a *second* winding 44 connected in series with output terminal 16. In many respects, this auxiliary transformer is similar to the differential transformer but it will be noted from the polarity markings that windings 24 and 44 are connected in series opposition, *whereas windings 42 and 44 are connected in series-aiding relationship.* Accordingly, in the presence of a low impedance short circuit at 36, the potential across winding 44 will oppose that across winding 24 so that winding 24 and, consequently, winding 22 will "see" a high impedance. Thus, there will be no loading effect on the differential transformer and the circuit breaker 26 will trip at substantially the same differential current regardless of the value of the impedance of ground 36.

The circuit of FIG. 3 operates in substantially the same manner as that of FIG. 2. However, in this modification there is provided an auxiliary transformer 46 which includes a primary winding 48 across the line and neutral conductors and a secondary winding 50 in series with terminal 16. From the polarity markings, it will be seen that secondary winding 50 is in series opposition to winding 24. In the presence of a low impedance ground 36, the result is substantially similar to that described in FIG. 2, i.e., the winding 22 "sees" a high impedance across winding 24 so that the differential current required to operate circuit breaker 26 remains substantially unchanged.

It will be understood by those skilled in the art that various modifications may be made in this invention. However, in an operative embodiment constructed as shown in FIG. 2, windings 22 and 24 were each of twenty turns and winding 30 was a single turn. Windings 42 and 44 were each of sixteen turns. In an embodiment constructed as shown in FIG. 3, the differential transformer was similar to that of FIG. 2. However, winding 48 had a total of five thousand turns and winding 50 a total of five turns.

It will also be apparent to those skilled in the art that many other modifications and changes may be made in this invention without departing from its spirit and scope. Accordingly, the foregoing description is to be construed as illustrative only, rather than limiting.

What we claim as new and desire to secure by Letters Patent of the United States is:

[1. An electrical load circuit protective device comprising: differential transformer means having first and second primary windings in series, respectively, with the line and neutral conductors supplying a load; circuit interrupting means in said line conductor responsive to unbalanced current flow in said primary windings to open said line conductor; and an inductance in said neutral conductor in series with said second primary winding.]

[2. The device of claim 1 wherein said inductance comprises an auxiliary transformer having an auxiliary primary winding energized from said line conductor and a secondary winding, said secondary winding being in series with said second primary winding and having a polarity in series opposition therewith.]

[3. The device of claim 2 wherein said auxiliary primary winding is in series with said first primary winding.]

[4. The device of claim 2 wherein said auxiliary primary winding is connected across said line and neutral conductors.]

[5. The device of claim 1 wherein one end of each of said first and second primary windings is connected, respectively, to first and second input terminals and wherein said circuit interrupting means and said inductance are connected, respectively, in series with first and second output terminals.]

*6. An electrical load circuit protective device comprising: differential transformer means having first and second primary windings in series, respectively, with the line and neutral conductors supplying a load; circuit interrupting means in said line conductor responsive to unbalanced current flow in said primary windings to open said line conductor; and an auxiliary transformer having first and second windings in the line and neutral conductors respectively, and connectable through the load in series-aiding relationship.*

* * * * *